United States Patent [19]

Nguyen et al.

[11] Patent Number: 5,455,780
[45] Date of Patent: Oct. 3, 1995

[54] METHOD OF TRACKING MATERIAL IN A WELL

[75] Inventors: Philip D. Nguyen, Duncan; Gary A. Woodbridge, Chickasha, both of Okla.; Vincent G. Reidenbach, Wassenaar, Netherlands

[73] Assignee: Halliburton Company, Duncan, Okla.

[21] Appl. No.: 202,694

[22] Filed: Feb. 25, 1994

Related U.S. Application Data

[63] Continuation of Ser. No. 770,539, Oct. 3, 1991, abandoned.

[51] Int. Cl.⁶ ........................................ G06G 7/48
[52] U.S. Cl. ........................ 364/578; 364/509; 364/510
[58] Field of Search .................... 364/578, 427, 364/420, 509, 510; 166/248, 250; 395/928, 925

[56] References Cited

U.S. PATENT DOCUMENTS

| | | | |
|---|---|---|---|
| 4,571,993 | 2/1986 | St. Onge | 73/151 |
| 4,654,802 | 3/1987 | Davis | 364/502 |
| 4,677,587 | 6/1987 | Zemany, Jr. | 364/900 |
| 4,726,219 | 2/1988 | Pearson et al. | 73/53 |
| 4,747,060 | 5/1988 | Sears, III et al. | 364/481 |
| 4,754,641 | 7/1988 | Orban et al. | 73/155 |

OTHER PUBLICATIONS

"Mechanics of Gravel Placement And Packing: A Design And Evaluation Approach," M. A. Wahlmeier and P. W. Andrews, *SPE Production Engineering*, pp. 69–82 (Feb., 1988).

Dowell Schlumberger leaflet entitled "Sand Control, Pac-Cade Placement Software System" (believed to be before Oct., 1990).

SPE 19753 entitled "Numerical Simulation of Gravel Packing," P. H. Winterfeld and D. E. Schroeder, Jr. (1989).

SPE 15519 entitled "Techniques For Planning And Execution To Improve Foam Cement Job Performance", by D. S. Kulakofsky and P. G. Creel, Halliburton Services and D. L. Kellum, Parker & Parsley, (1986).

Pp. 237–244 of "Programming Concepts And Problem Solving An Introduction to Computer Science Using Pascal", by Peter Linz (1983).

Pp. 155–160 of "Programming Concepts And Problem Solving An Introduction To Computer Science Using Pascal", by Peter Linz (1983).

SPE 13045 entitled "The Phenomenon of Free Fall During Primary Cementing" by R. M. Beirute, (1984).

Publication entitled "Mathematical algorithm aids analysis of 'U-tubing' during slurry placement" by M. Wahlmeier and S. Lam, Oil & Gas Journal (Jan. 7, 1985).

SPE 16649 entitled "A Technique for Onsite Diagnosis of Cement Job Problems: The Concept of Job Signatures" by R. M. Beirute, (1987).

*Primary Examiner*—Emanuel T. Voeltz
*Assistant Examiner*—Kamini S. Shah
*Attorney, Agent, or Firm*—Robert A. Kent; E. Harrison Gilbert, III

[57] ABSTRACT

A method of tracking material in a well comprises the steps of: (a) creating in a computer a model of the structure of the well, including defining a first plurality of sets of data to define sectors of a flow path in the well; (b) creating in the computer a first model of the material in the well, including defining a second plurality of sets of data to define initial conditions of material within the sectors; and (c) creating in the computer, in response to the first plurality of sets of data and the second plurality of sets of data, a second model of the material in the well, including defining a third plurality of sets of data of current conditions of material within the sectors.

5 Claims, 7 Drawing Sheets

METHOD OF TRACKING MATERIAL IN A WELL

This is a continuation of application Ser. No. 07/770,539 filed on Oct. 3, 1991, now abandoned.

BACKGROUND OF THE INVENTION

This invention relates generally to a method of tracking material, such as a gravel packing fluid, in a well. In a particular application, the method of the present invention can be used in a simulator for simulating where material will be distributed in a well bore due to a simulated fluid flow through a selected one of several possible flow paths or channels.

While an oil or gas well is being drilled or completed, materials are continually being put into and taken out of the well. For example, drilling mud for lubricating the drill bit and washing cuttings out is circulated into and out of the well as it is being drilled. During stimulation or completion, various treating materials, such as fracturing fluids, acidizing fluids or gravel packing fluids, may be pumped into the well.

It is desirable to keep track of any such materials so that an operator knows what is happening in the unseen downhole environment and whether it is going according to plan. With the increasing use of computers, the ability to track these materials accurately is improving.

Proper control of the drilling or completing of a well is managed not only by tracking actual material movement and disposition in a well, but also by beforehand creating a plan for how and where the material should go and then simulating material movement and disposition to evaluate the plan. Thus, material tracking can and should include both simulated and actual tracking of material in the well under study.

A specific example of where computer-implemented material tracking simulation has been tried is with gravel packing. When sand is produced from a well along with the oil or gas, the sand can cause problems such as equipment damage and reduced production of the oil or gas. One way to inhibit sand production is to pump gravel down into the well so that it packs tightly to minimize the movement of sand grains produced from the formation during the production of oil or gas. The effectiveness of this treatment can be critical to the viability of the well; therefore, properly planning and executing a gravel pack job is important. Tracking material by simulating the pumping in and placement of the gravel pack material is thus desirable for evaluating the likely success of a given plan.

The computer-implemented material tracking simulation methods of which we are aware, specifically those adapted for gravel packing simulations, require large, expensive computers (e.g., a Cray/X-MP computer). These prior proposals must repeatedly calculate and recalculate data during each time at which the material tracking is done. That is, they use iterative problem-solving techniques which require vast computing power to perform the overall method within an acceptable time. The prior methods of which we are aware also typically require significant assumptions which can adversely affect the accuracy of what is simulated compared to what may occur in the actual three dimensional downhole environment. Thus, there is the need for an improved method of tracking material, such as gravel packing fluid or slurry, in a well whereby a smaller, less expensive computer can be used and whereby more accurate three dimensional analysis can be made.

SUMMARY OF THE INVENTION

The present invention overcomes the above-noted and other shortcomings of the prior art by providing a novel and improved method of tracking material in a well. At each time when tracking is done, a non-iterative process is used; therefore, a smaller, less expensive computer can be used for implementing the present invention as compared to implementations of suggested prior material tracking methods of which we are aware. Despite less computing power being required by the present invention, however, computations are made throughout the entire volume under study so that more accurate three-dimensional tracking occurs. Furthermore, the method of the present invention can track material along any of several flow paths or channels.

The method of the present invention for tracking material in a well comprises the steps of: (a) creating in a computer a model of the structure of the well, including defining a first plurality of sets of data to define sectors of a flow path in the well; (b) creating in the computer a first model of the material in the well, including defining a second plurality of sets of data to define initial conditions of material within the sectors; and (c) creating in the computer, in response to the first plurality of sets of data and the second plurality of sets of data, a second model of the material in the well, including defining a third plurality of sets of data of current conditions of material within the sectors. Preferably step (c) is repeated, but using the previously created third plurality of sets of data as the second plurality of sets of data called for in the repeated step. Step (c) also preferably includes solving for each sector a predetermined matrix of equations using data from the first and second pluralities of sets of data. This is preferably performed non-iteratively. That is, the matrix of equations for each sector is solved only one time during step (c) and each repetition thereof.

The method of the present invention also accommodates tracking through multiple flow channels. More particularly, the present invention provides a method of tracking material in a well having a plurality of flow channels through which the material can flow, comprising the steps of: (a) selecting a plurality of sets of data to define sectors of the well encompassing the flow channels throughout three dimensions of the well, including defining a geometry for each sector so that each sector spans a linear dimension and an angular dimension of the well; (b) providing pluralities of sets of equations for defining current conditions of material flowing through the selected sectors, each of the pluralities of sets of equations assigned for a respective one of the flow channels; (c) indicating a flow of material through a selected one of the flow channels; and (d) determining current conditions of the indicated flow of material within each sector, including solving the respective plurality of sets of equations for the selected flow channel.

Therefore, from the foregoing, it is a general object of the present invention to provide a novel and improved method of tracking material in a well. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

The preferred embodiment of the present invention will be described in the context of a simulator for simulating a gravel packing job. The simulator uses the method of the present invention for tracking material indicated to be pumped into a simulated well during the simulated gravel packing job. Before the present invention is described, however, the gravel packing environment and the multiple flow paths or channels it provides will be described with reference to FIGS. 1–4.

Figure 1A:
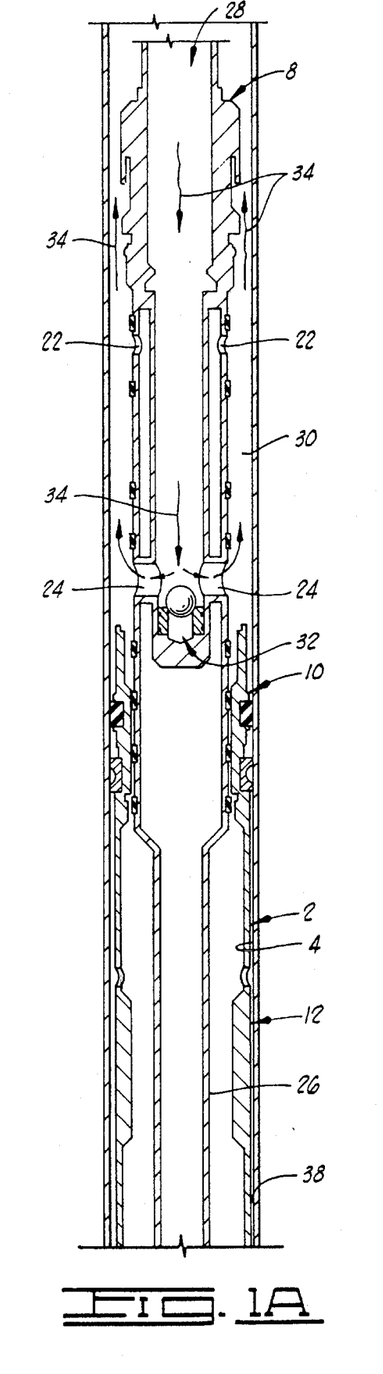
FIG. 1A and 1B are a schematic drawings showing the port and reverse flow position of a gravel pack system.
Figure 1B:
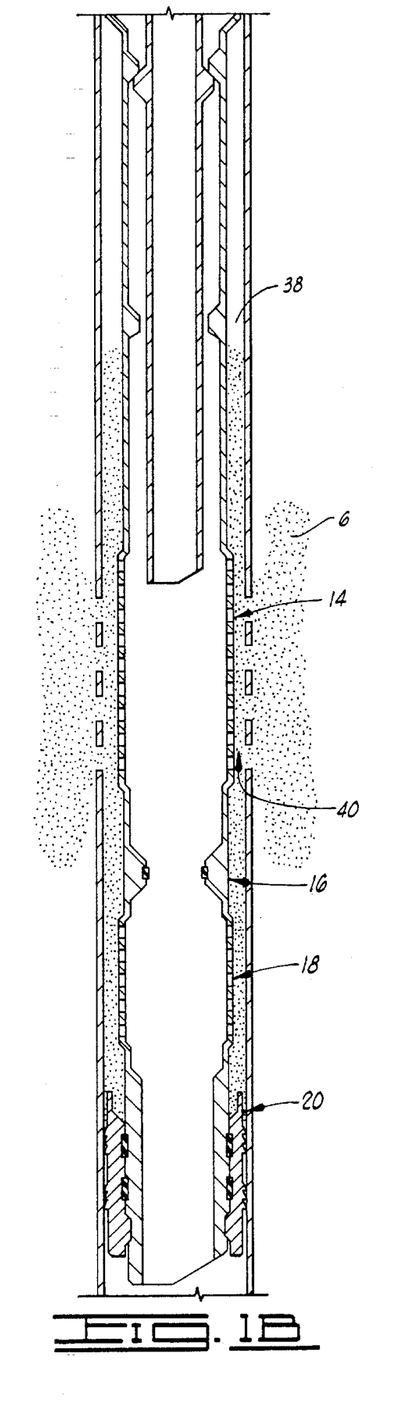

Referring first to FIG. 1, a gravel packer assembly 2 is fixed in a well 4 across a formation 6 containing oil or natural gas and sand which is to be blocked by the gravel packing system. Positioned in the assembly 2 is a tool 8 that can be moved longitudinally relative to the assembly 2 by lowering or raising a pipe string (not shown) to which the tool 8 is connected and which extends to the surface as known in the art. Different relative positions between the assembly 2 and the tool 8 provide different flow channels as will be subsequently described.

The gravel packer assembly 2 includes a gravel pack packer 10, a ported flow sub 12, a production screen 14, an O-ring sub 16, a telltale screen 18 and a sump packer 20. These are conventional pieces of equipment connected in a conventional manner. For example, the gravel pack packer 10 can be implemented by an OTIS VERSA-TRIEVE™ packer.

The tool 8 is likewise conventional, such as an OTIS/VANN multi-position tool. This tool includes upper ports 22, lower ports 24 and a washpipe 26.

When the tool 8 is positioned relative to the gravel packer assembly 2 as shown in FIG. 1, the system is in a port mode or a reverse out mode. In the port mode, fluid material can be pumped down the pipe string, through an axial passageway 28 of the tool 8 and out the lower ports 24 into an annulus 30 of the well 4 outside the tool 8. Further downward flow is blocked by a valve 32 of the tool 8 and by the packer 10. This flow channel is indicated by the arrows 34. The reverse mode provides the same flow channel as just described, but flow occurs in the reverse direction.

Figure 2A:
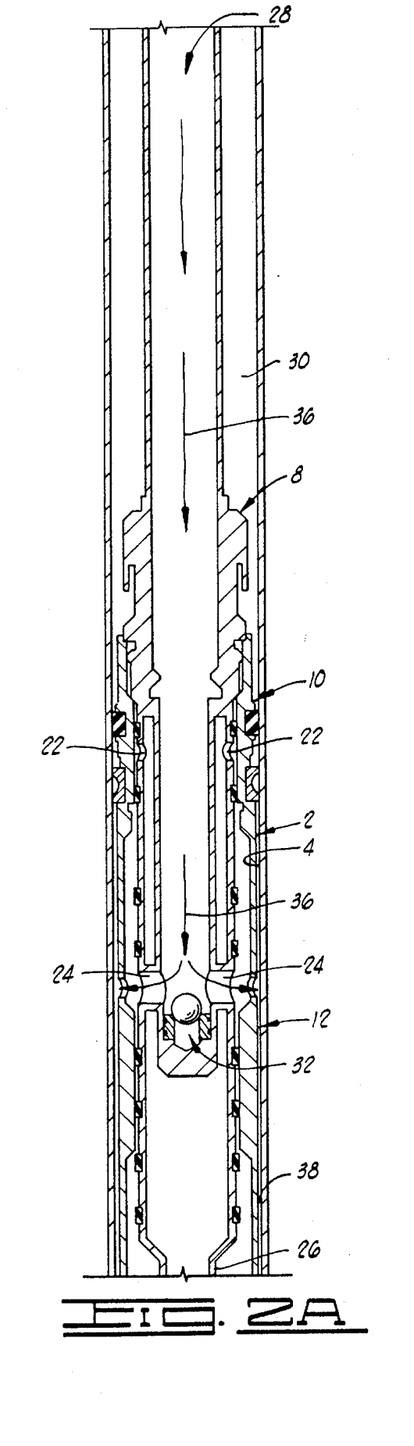
FIG. 2A and 2B are a schematic drawings showing the squeeze position of the gravel pack system.
Figure 2B:
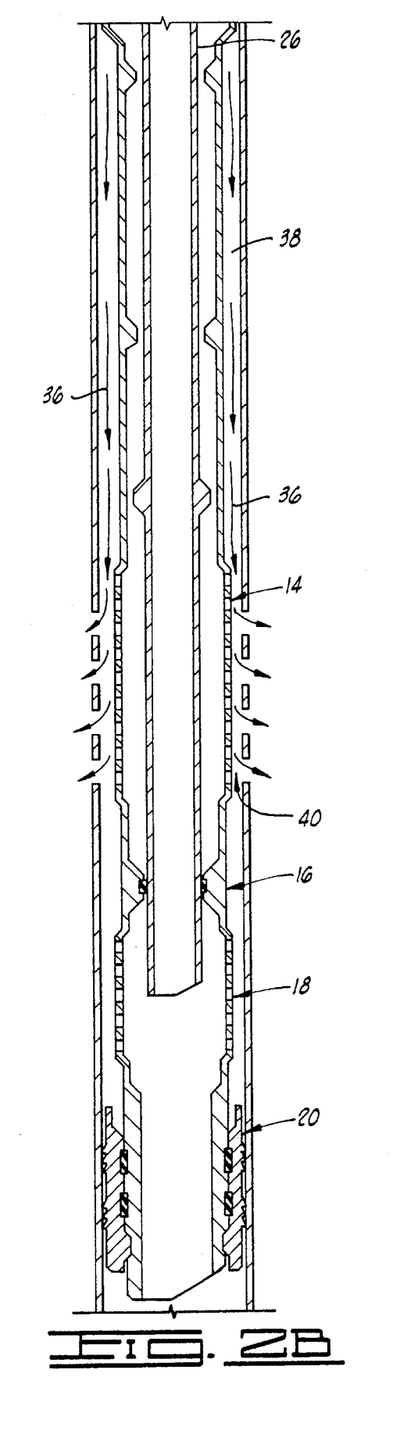

Another flow channel exists when the tool 8 and the gravel packer assembly 2 are relatively positioned as illustrated in FIG. 2. Arrows 36 designate that flow occurs through the passageway 28, the lower ports 24, the ported flow sub 12, a lower annulus 38 and out into the formation 6 through perforations 40. This flow channel is used in a squeeze mode of operation, such as when a treating fluid is to be forced into the formation.

Figure 3A:
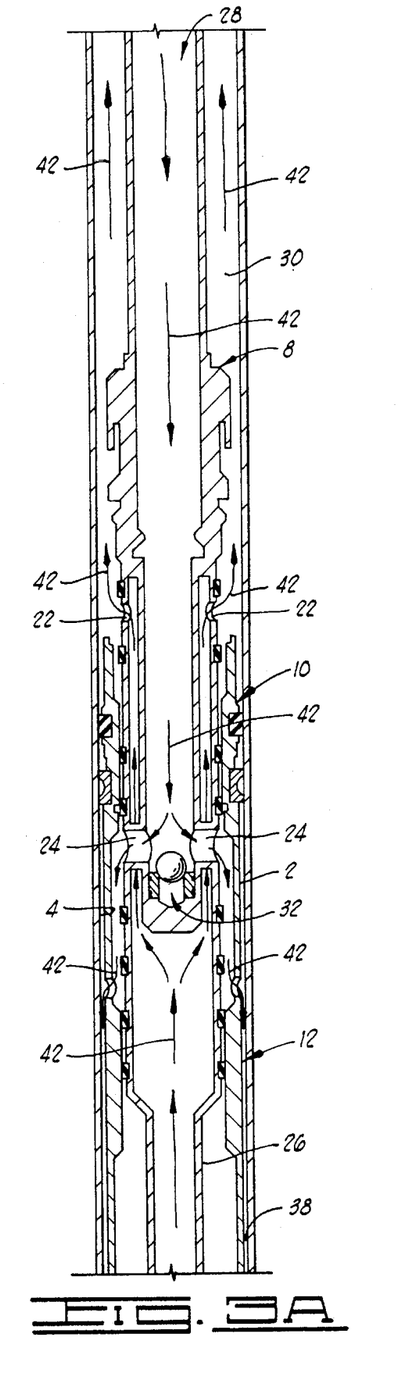
FIG. 3A and 3B are a schematic drawings showing the upper circulating position of the gravel pack system.
Figure 3B:
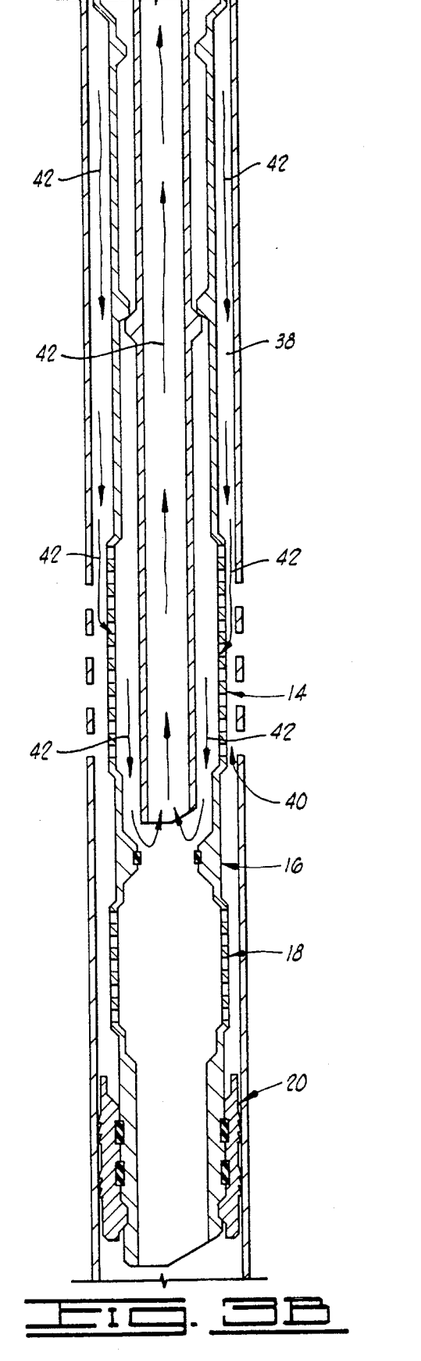

The flow channel for an upper circulating mode of operation is illustrated in FIG. 3. Flow along this channel, indicated by arrows 42, passes through the passageway 28, out the lower ports 24 and the ported flow sub 12, down the annulus 38, in through the production screen 14, around and into the lower end of the washpipe 26, out the upper ports 22 and up the annulus 30.

Figure 4A:
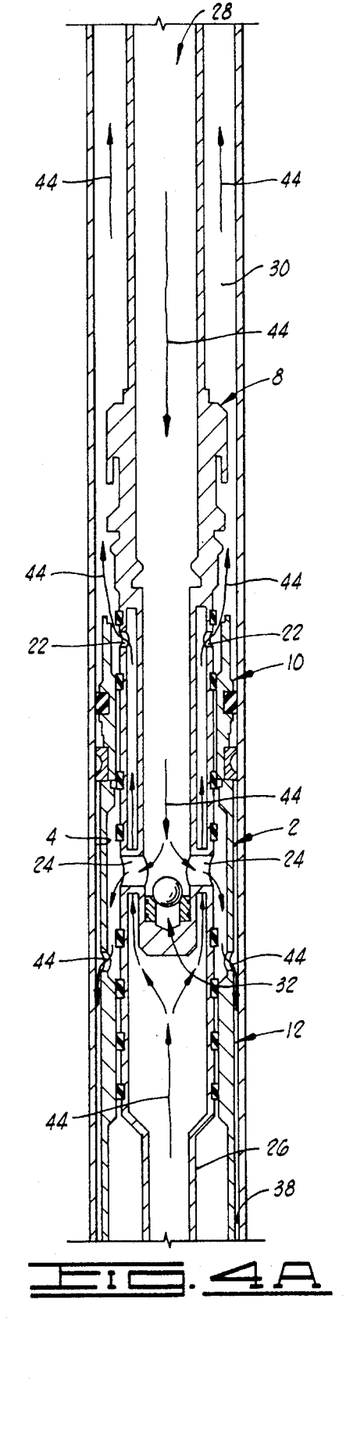
FIG. 4A and 4B are a schematic drawings showing the lower circulating position of the gravel pack system.
Figure 4B:
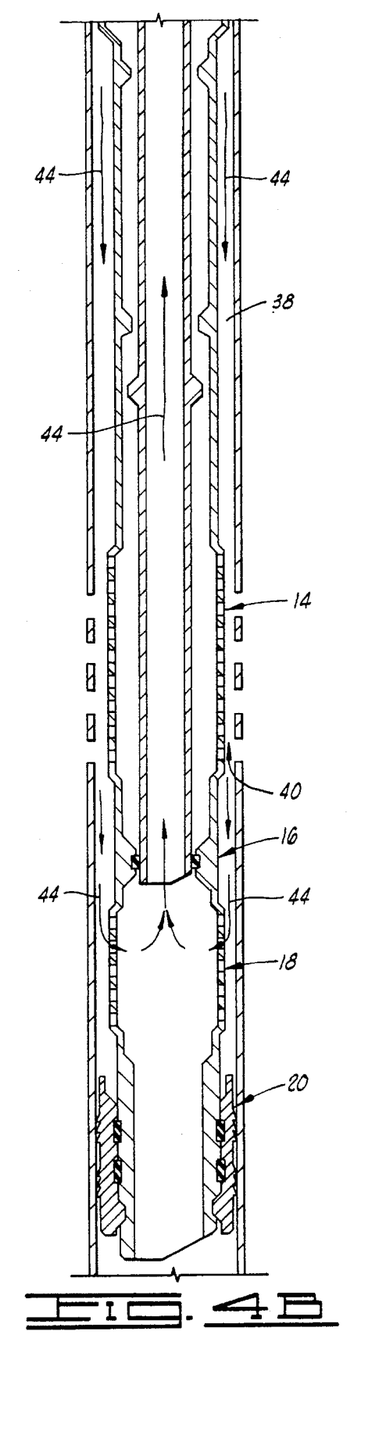

Referring to FIG. 4, arrows 44 indicate flow along the flow channel for a lower circulating mode. This channel is the same as for the upper circulating mode except that the downward flow moves radially through the telltale 18 instead of through the production screen 16 prior to entering the lower end of the washpipe 26.

The flow channels described above are the primary flow paths for the respective modes, but other paths exist. For example, leak-off into the formation 6 can occur in the upper and lower circulating modes. For convenience, these secondary flow paths will be disregarded in the following description of the present invention; however, the present invention can be adapted to account for flow into these secondary channels or paths.

To track material in a well in accordance with the method of the present invention, a model of the structure of the well is created in a computer. This includes defining a plurality of sets of data identifying sectors of a flow path in the well. The method further comprises creating in the computer a first model of the material in the well. This includes defining a plurality of sets of data identifying initial conditions of material within the sectors. In response to the aforementioned pluralities of sets of data, a second model of the material in the well is created in the computer. This includes defining a plurality of sets of data of current conditions of material within the sectors. The step of creating the structural model will be further described with reference to FIGS. 5–7, after which the steps of creating the two material models will be further described with reference to FIG. 7.

To facilitate making the computations needed in tracking the material in the well, the downhole structure is modeled by dividing it into finite units or divisions wherein it can be assumed that a single type of material (e.g., liquid or slurry) will have uniform characteristics throughout the division. Above the packer 10, this can be based solely on cross-sectional geometry because flow in this portion of the well 4 will be axial either in the pipe string or upper part of the tool 8 or in the annulus 30, and the residence of the material in this portion of the well is likely transient or insignificant so that concern with any gravitational, well deviation or other three-dimensional factors is minimal in the particular environment of a gravel packing job. Therefore, the structure above the packer 10 can be segmented axially and radially in the same manner as described in U.S. Pat. No. 5,072,404 to Schmitzer et al. issued Dec. 10, 1991 and assigned to the assignee of the present invention, which is incorporated herein by reference. Thus, if tracking material were limited to above the packer 10 (e.g., if the gravel packing example were only used in the port mode or the reverse mode), the method of the incorporated reference could be used.

Because our example is not so limited, however, an enhanced dividing of the well structure below the packer 10 must be used. Below the packer 10, different outward and inward radial flows can occur and three-dimensional effects must be accounted for because this is the region where at least part of the tracked material is to be deposited. The resulting deposits will not necessarily be symmetrical across the three-dimensional environment below the packer 10 in our exemplified use of the present invention in tracking gravel packing material. Therefore, below the packer 10 the structure is divided not only axially and radially as above the packer 10, but also angularly.

Figure 5:
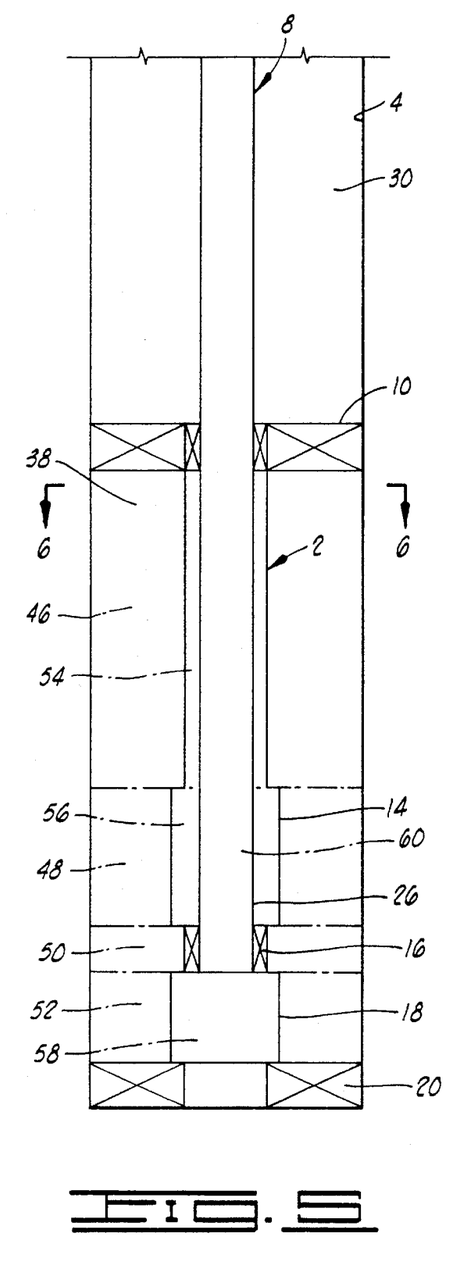
FIG. 5 is a schematic drawing showing in elevation a well bore structure divided into sectors.
Figure 6:
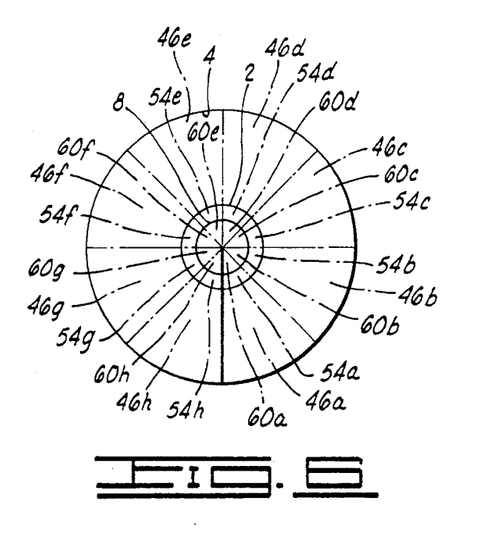
FIG. 6 is a schematic drawing showing in plan a section, taken along line 6—6 in FIG. 5, of the well bore structure divided into sectors.

Referring to FIG. 5, the schematic well structure is shown axially segmented by the dot-dash lines. These axial segments are divided radially based on the structures encountered across a transverse cross section of the well (i.e., in FIG. 5 radial boundaries are defined by the outer limit of the well 4, the gravel packer assembly 2 and the tool 8). Thus, the simplified structure illustrated in FIG. 5 below the packer 10 is divided into segments 46, 48, 50, 52, 54, 56, 58 and 60. To account for three dimensional effects (e.g., well deviation and gravity), however, the segments further are "sectorized" by angular divisions. This is illustrated in FIG. 6. Thus, three dimensional sectors (referred to both here and in the claims simply as "sectors") are defined. By sectoring, different features or effects throughout the three dimensions of the well can be accommodated. For example, sectors can be defined based at least in part by the distribution of the perforations 40 around the circumference of the well 4.

FIG. 6 shows that the annulus 38 is, within one axial segment thereof, represented by sectors 46a, 46b, 46c, 46d, 46e, 46f, 46g and 46h. Each of these sectors is defined by radially inner and outer partial cylindrical surfaces and by circumferential planar sides intercepting the partial cylindrical surfaces. The annular region between the gravel packer assembly 2 and the tool 8 for this axial segment is represented by similarly shaped sectors 54a, 54b, 54c, 54d, 54e, 54f, 54g and 54h. The interior of the tool 8 at the illustrated cross-sectional location is represented by pie-shaped sectors 60a, 60b, 60c, 60d, 60e, 60f, 60g and 60h.

To implement the sectors, an operator selects a plurality of sets of data which define the sectors encompassing the flow channels throughout three dimensions of the well. Each set of data includes geometrical information defining the sector. In the specific gravel packing example referred to herein, this includes length and depth information, true vertical length and depth information, inner and outer diameter information and angular information. Thus, each sector is defined to span a linear dimension and an angular dimension of the well.

Figure 7:
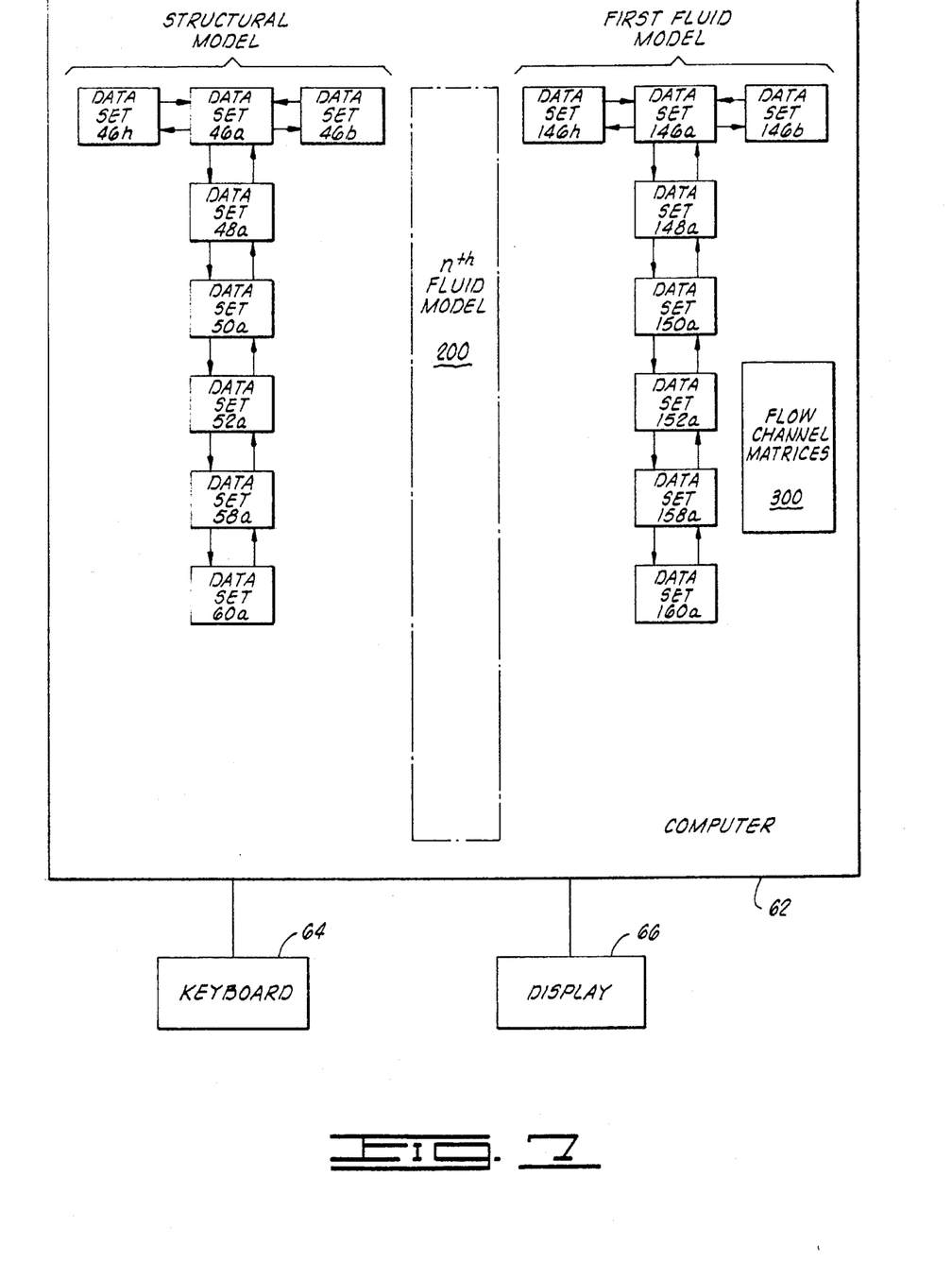
FIG. 7 is a block diagram for illustrating the methodology and organization within a computer for implementing the method of the present invention.

Each set of data also includes pointers to the sets of data for adjacent sectors. These pointers create doubly linked sets of data as in the method of the aforementioned incorporated reference. This linking is illustrated in FIG. 7 wherein data sets defining sectors 46a, 48a, 50a and 52a are doubly linked. Double linking also exists between adjacent angular sectors (e.g., 46a and 46b, and 46a and 46h) and between radially adjacent sectors where radial flow can occur (e.g., 52a and an adjacent sector 58a, sector 58a is in turn doubly linked to sector 60a). Thus, any one sector can be doubly linked to up to six sets of data representing the six adjacent sectors (i.e., the adjacent axial sectors, the adjacent radial sectors and the adjacent angular sectors).

The sets of data are created in a computer 62 (FIG. 7) by entering the necessary information through a keyboard 64 or other suitable data entry device. The encoded electrical signals from the keyboard 64 are converted in a conventional manner into signals appropriate for storing in a memory of the computer 62. These signals as stored define the sets of data by which the structural model is created in the method of the present invention. The computer 62 and the keyboard 64 are conventional types. Preferably, the computer 62 is presently a desktop computer such as a RISC 6000 computer; however, it is contemplated that the invention can be adapted for use on even a smaller computer, such as a PC type.

The foregoing is done to account for the various boundary conditions of the geometries for each flow channel. Thus, the overall structural model will model and encompass all the desired flow channels.

Once the structural model is created it is retained in the computer 62 for the duration of the simulation. The various models of the material, which will now be described, are not similarly retained in the preferred embodiment of the present invention. In the preferred embodiment, the first material model is created and then a second one is created based on the information in the structural model and the first material model. The first material model is then deleted from memory and replaced by the second material model. At the next material tracking time, a third material model is made based on information from the fixed structural model and the second material model. The second material model is then deleted and replaced by the third material model. This is continually repeated throughout the tracking so that current conditions of the flowing material are defined in the current, nth, material model based on the information in the original structural model and the n-1th material model (in its broadest definition beginning with the first two material models, n is a whole number greater than 1).

The first material model is created from information in the structural model and from information input by the operator through the keyboard 64 (or other data entry device) as to the initial conditions of the material. Thus, the first model includes sets of data signals stored in the memory of the computer 62. These signals are converted from the electrical signals input by the operator and encoded to define the material and initial conditions thereof within the three-dimensional environment represented by the sets of signals of the structural model. These signals define in the computer known characteristics of the material in the three-dimensional environment. In the preferred embodiment, these known characteristics are the numerical averages of characteristics at the boundaries of the sectors. With regard to our example of tracking material in a well by simulating a gravel packing job, these characteristics include the n and k' fluid parameters and gravel and pump rate information. This first material model has the same number of sets of data to correspond to the sets of data in the structural model. This is illustrated in FIG. 7 by data sets 146a, 148a, 150a, 152a, 158a and 160a. These data sets are doubly linked in the same manner as the data sets of the structural model.

Once the structural model and the first material model have been created in the computer 162, fluid tracking is performed by computing current conditions of the material in each sector for a given flow of material indicated to be occurring (e.g., a simulated flow in our gravel packing example, but it could be a sensed actual flow). These current conditions result from the creation of the second, and other subsequent, material models generally described above. These further material models are responsive to volumetric amounts of the flowing material to be tracked so that there are typically more sets of data in the second and subsequent material models as larger volume sectors are subdivided into subsectors which pertain to only one type of material. This subdividing concept is broadly the same as described in the aforementioned incorporated reference. Because these further models change with the dynamics of the fluid tracking, they will also be referred to herein as the dynamic material models (as opposed to the static original material model which is defined by the operator and is deleted once the second material model is created). One of these dynamic models, generally identified as nth fluid model 200, is depicted in FIG. 7 by a dashed line box to represent the variable nature of its size.

The computations which are made in creating these dynamic material models are made by solving a matrix of equations for each sector (i.e., either the complete sector if it does not need to be subsectored or the subsectors thereof if it does) after memory has been allocated for the model and results from the previous material model have been incorporated. There are a plurality of such matrices stored in the memory of the computer 62 as indicated in FIG. 7 by the reference numeral 300. Each matrix includes a set of simultaneous equations specifically adapted for the desired fluid tracking. Specific equations are not significant to the present invention because they will vary depending on the information desired. Once calculations have occurred, however, outputs can be provided via a display 66 or other output device. For our gravel packing example, numerical and graphical outputs include pressures, flow rates and distributions of gravel.

Solving each matrix also provides updated coefficients to be used in the matrix at the next run time (i.e., the next time tracking occurs). Although tracking is done repetitively over a span of time, at each single tracking computation the utilized matrices are solved only one time. That is, the method of the present invention does not use an iterative computational technique such as is required by other types of methods (e.g., ones using finite element analysis).

At each solution time, one matrix is solved for each sector or subsector; therefore, the current conditions are determined for every unit which has been defined throughout the structurally modeled three-dimensional environment in the well. This is done even for regions where no flow occurs, such as in the portion below the packer 10 in the port mode of our gravel packing example, so that a complete material model is always maintained should the flow channel mode be changed.

Further with regard to different flow channel modes which can be accommodated by the present invention, there is a unique plurality of matrices for each flow channel mode to account for the different flows which can result. Although each overall plurality of matrices is unique to its particular mode, individual matrices within the different sets may be the same. During any one material tracking event or determination, only the respective plurality of matrices for the active flow channel will be solved. To accomplish this, each set of data within the structural model has a plurality of pointers to identify the respective sets of matrices. For example, each set of data in the structural model shown in FIG. 7 has four pointers corresponding to the four primary flow channels depicted in FIGS. 1–4. One pointer of each data set links the data set to its respective matrix of the set of matrices for the port mode wherein the material flows through the channel shown in FIG. 1; a second pointer of each set links to its respective matrix of the set of matrices for the squeeze mode having the channel shown in FIG. 2; a third pointer of each set links to its respective matrix of the set of matrices for the upper circulating mode having the channel shown in FIG. 3; and a fourth pointer of each set links to its respective matrix of the set of matrices for the lower circulating mode having the channel shown in FIG. 4. Thus, each pointer is associated with a respective set of equations and a respective one of the flow channels so that there is in effect a structural model and corresponding equations for each flow channel.

In accordance with the foregoing, sets of signals are created within the computer 62. These signals are encoded to define current conditions of the material in the sectors. In this process, subsectors are defined as needed to track material volumes within the sectors. Furthermore, sets of simultaneous equations are solved in the computer in response to the previously created sets of signals defining the structural model and the last prior material model. At each tracking time, each set of equations involved for the selected mode or flow channel is solved only one time for each subsector or undivided sector. The foregoing is performed and repeated, thereby at any one time creating an nth plurality of sets of signals in response to the original structural model and the n-1th material model. This is continued until the material has been tracked through the portion of the well represented by the sectors of the plurality of sets of signals for the structural model.

Figure 8:
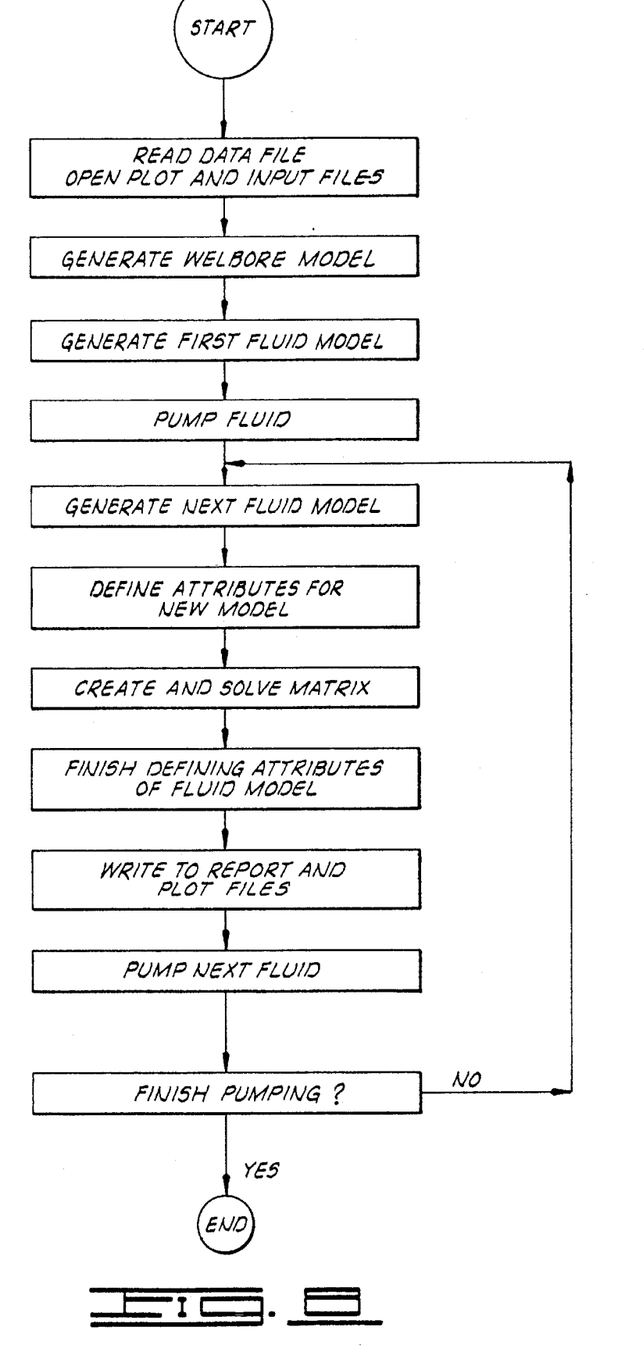
FIG. 8 is a flow chart of a computer program for the method of the present invention.

As indicated above, the preferred embodiment of the present invention is implemented using a programmed computer into which structural and material data are entered via a keyboard or other data entry device and from which information is output via a display or other device providing human readable information. A specific computer has been identified above, but other types of computers can be used as would be readily apparent to those skilled in the art. Further by way of example only, a flow chart of a computer program for implementing the method of the present invention in the context of our example of a gravel packing simulator is shown in FIG. 8. An overview of the program follows.

The program of FIG. 8 uses the numerical averaging technique referred to hereinabove. This program considers the flow rates (or mass) and pressures (or momentum) to be the average of values existing at the boundaries of each sector. The program uses algebraic equations to perform mass and momentum balances for each sector. As previously explained, in the preferred embodiment these equations are solved simultaneously within respective matrices. Since the unknown variables are computed directly, there is no iteration in the numerical analysis at any one solution period thereby reducing computing time.

To correctly compute the hydrostatic pressure and friction pressure during the simulation, it is necessary for the program to monitor the properties of a single fluid at an instant time increment. In order to achieve this, the existing axial sectors that contain more than one fluid must be further divided into smaller sectors. Each subsector contains only a single fluid. This process is repeated for each time increment in which a certain volume of a fluid is being pumped into the sector. As a result, the number of sectors alters dynamically with time. They can be increased or decreased depending on the flow rates, fluid volumes, and wellbore parameters.

Conservation of mass and momentum must be considered in each of these sector elements to monitor its fluid transport processes (Equations 1–6):

Mass and Momentum Balance for Formation/Screen
Mass Balance:

$$(Q_{sl})_{i,j} + (Q_{sl})_{i,j-1} + (Q\epsilon)_{i-1,j} = \quad (1)$$

$$(Q_f + Q_s + Q\epsilon + Q_{sl})_{i,j} - (Q_{sl})_{i-1,j}$$

Momentum-Formation:

$$P_f = \left[ \frac{P_{i-1,j} + P_{i,j}}{2} \right] + (C_f)_{i,j}(Q_f)_{i,j} \quad (2)$$

-continued
(Equations 1-6):

Momentum-Screen:

$$\left[\frac{P_{i-1,j}+P_{i,j}}{2}\right] - \left[\frac{(P_{wp})_{i-1}+(P_{wp})_i}{2}\right] - (C_{scr})_{i,j}(Q_{scr})_{i,j} = 0 \quad (3)$$

Momentum-Annulus:

$$\rho_s L = \left(\frac{Q_{i-1,j}+Q_{i,j}}{2}\right) C_{i,j} - P_{i-1,j} + P_{i,j} \quad (4)$$

Mass and Momentum Balance for Screen/Washpipe

Mass Balance:
$$(Q_A)_{i-1} + \Sigma (Q_{scr})_{i,j=1,jmax} = Q_{A_i} \quad (5)$$

Momentum-Annulus:

$$\rho_1 L = \left(\frac{(Q_A)_{i-1}+(Q_A)_i}{2}\right) C_i - (P_{wp})_{i-1} + (P_{wp})_i \quad (6)$$

where:
C = coefficient
L = sector length
Q = flow rate
P = pressure
$\epsilon$ = void fraction
$\rho$ = fluid density
Subscripts:
A = screen/washpipe annulus
f = formation
i = sector element (axial direction)
j = sector element (angular direction)
s = slurry
scr = screen
wp = washpipe
sl = settling effect The amount of gravel packed in the perforations and casing/screen annulus during the gravel pack treatment is affected by numerous factors: pump rate, rates of fluid leak-off through the screen and formation, effect of sand settling, degree of deviation of the wellbore, etc.

A newly developed correction enhances the capability of the program in evaluating the rates of fluid leak-off to the formation for each individual fluid pumped downhole (Equation 7):

$$Q_{LO} = Q_{LO}(\Delta P, \mu_1, k, D_i) \quad (7)$$

where:
$\Delta P$ = differential pressure
$\mu_1$ = fluid viscosity
k = formation permeability
$D_f$ = distance fluid travels in formation Each band of fluid leaking off to the formation per sector can be determined as a function of time or volumes pumped. The leak-off rate and band width of the individual fluids are controlled by the differential pressure (between formation/screen annulus and formation pressures), fluid transport property, and formation permeability. Hence, the application of high viscosity "pre-pad" fluid, acting as a control system for fluid leak-off to minimize sand bridging, can be investigated.

Effect of sand settling depends on a number of factors: density and transport properties of carrier fluid, pump rate, gravel concentration and gravel particle size, etc. (Equation 8).

$$V_S = V_S(\rho_p, \rho_1, \epsilon, \mu, d_p) \quad (8)$$

where:
$\rho_p$ = gravel density
$\rho_1$ = carrier fluid density
$\epsilon$ = void fraction in slurry
$\mu$ = apparent effective carrier fluid viscosity
$d_p$ = gravel particle diameter Rate of sand settling, orientation of wellbore (from vertical to highly deviated angle), and fluid leak-off rate should determine the gravel accumulated in each sector. Implementation of sand settling effect into the model enhances its capability in handling various gravel pack treatment designs. By differentiating the transport properties of slurry carrier fluids, ranging from highly viscous polymers to simple water, the model allows optimization to select the best gravel pack fluid which would give optimal gravel placement.

The rheological property of each fluid is vitally important in all aspects of transport processes, for either gravel free fluids or gravel laden slurries, during the simulation of the gravel placement. The program provides sufficient examination of fluid behavior to indicate changes of transport properties of gravel pack fluids under static or dynamic conditions, in temperature range of wellbore, and under influence of variable sand concentration.

The three-dimensional orientation allows the program to accommodate recent improvements in perforating technology, especially for highly deviated and horizontal wells. Situations may be handled where a potential incomplete packing may exist on the top portion of the casing/screen annulus due to settling. The program also permits a wide range of perforation phasing to suit various scenarios of perforating designs.

Thus, the present invention is well adapted to carry out the objects and attain the ends and advantages mentioned above as well as those inherent therein. While a preferred embodiment of the invention has been described for the purpose of this disclosure, changes in the performance of steps can be made by those skilled in the art, which changes are encompassed within the spirit of this invention as defined by the appended claims.

What is claimed is:

1. A computer-implemented method of simulating material flow in an oil or gas well to enable an individual to observe through the operation of the computer a simulated flow of material in a simulated well for representing flow of material in an actual well where the flow of material cannot be directly observed by, the individual, said method comprising:

selecting an oil or gas well having a known configuration of equipment disposed therein so that at least one flow channel exists in the well and further having known flow materials with known initial conditions disposed in the at least one flow channel;

simulating the at least one flow channel in a computer, including translating the known configuration of equipment of the selected well into encoded configuration-defining electrical signals in the computer and storing the encoded configuration-defining electrical signals in memory of the computer as a first plurality of linked sets of data to define sectors of the at least one flow channel of the selected well;

indicating to the computer a volumetric flow of material to be simulated in the simulated at least one flow channel;

determining with the computer a representation of material flow through the at least one flow channel, including translating the known flow materials and initial conditions of the selected well into encoded flow-material/initial-condition electrical signals and storing the encoded flow-material/initial-condition electrical signals in memory of the computer as a second plurality of linked sets of data to define in the computer the flow materials and the initial conditions of the material within the defined sectors, and representing in the computer a change in position of the flow materials by generating in the computer electrical signals defining a third plurality of linked sets of data representing current conditions of the material within the sectors in response to the first and second pluralities of sets of data and the volumetric flow of the material; and displaying for observation by an individual a representation of the simulated material in the simulated sectors of the at least one flow channel in response to the third plurality of sets of data.

2. A method as defined in claim 1, wherein the volumetric flow is a sensed actual flow of the material in the well.

3. A method as defined in claim 2, further comprising deleting from the computer the second plurality of linked sets of data after generating the third plurality of linked sets of data, and repeating said generating step but using the third plurality of linked sets of data as the second plurality of linked sets of data called for in repeating said generating step.

4. A method as defined in claim 3, wherein said generating step includes solving for each sector a predetermined set of equations only one time during each repetition of said generating step.

5. A method of tracking material in an oil or gas well with the air of a digital computer, comprising:

provi ding the computer with a data base for the well, including at least length, radial and angular data for three-dimensional geometric sectors of a flow channel in the well;

providing the computer with a data base for material in the sectors of the flow channel in the well, including at least initial condition data for the material;

initiating a simulator in the computer for tracking the material in the well upon the commencement of an indicated flow of material in the flow channel;

constantly determining the flow of the material indicated to be occurring in the flow channel;

constantly providing the computer with the determined flow of the material;

repetitively non-iteratively-calculating in the computer at frequent intervals during the indicated flow of the material, current conditions of the material in each sector for the determined flow; and operating a display device in response to the current conditions of the material so that the output of the display device relates to the current position of the material in the well whereby an individual viewing the display device tracks material flow that cannot be directly observed in the well.

\* \* \* \* \*